(12) United States Patent
Reyes et al.

(10) Patent No.: US 12,427,559 B2
(45) Date of Patent: Sep. 30, 2025

(54) ELECTROMAGNETIC INDUCTION HEATER

(71) Applicant: McMillan-McGee Corp, Calgary (CA)

(72) Inventors: Shiella Delos Reyes, Calgary (CA); Bruce C. W. McGee, Canmore (CA); David Nyarko, Calgary (CA); Edwin Walter Reid, Airdrie (CA)

(73) Assignee: McMillan-McGee Corp, Calgary (CA)

( * ) Notice: Subject to any disclaimer, the term of this patent is extended or adjusted under 35 U.S.C. 154(b) by 594 days.

(21) Appl. No.: 17/353,170

(22) Filed: Jun. 21, 2021

(65) Prior Publication Data

US 2021/0308730 A1 Oct. 7, 2021

Related U.S. Application Data

(63) Continuation of application No. 15/991,406, filed on May 29, 2018, now abandoned.

(60) Provisional application No. 62/512,148, filed on May 29, 2017.

(51) Int. Cl.
| | | |
|---|---|---|
| *B09C 1/06* | (2006.01) | |
| *B01F 27/72* | (2022.01) | |
| *B09C 1/00* | (2006.01) | |
| *B09C 1/08* | (2006.01) | |
| *E21B 36/04* | (2006.01) | |
| *H05B 6/10* | (2006.01) | |
| *H05B 6/36* | (2006.01) | |

(52) U.S. Cl.
CPC .............. *B09C 1/065* (2013.01); *B01F 27/72* (2022.01); *B09C 1/062* (2013.01); *B09C 1/08* (2013.01); *E21B 36/04* (2013.01); *H05B 6/108* (2013.01); *H05B 6/36* (2013.01); *H05B 2214/03* (2013.01)

(58) Field of Classification Search
CPC .......... B09C 1/06; B09C 1/062; B09C 1/065; B09C 2101/00; E21B 36/04; E21B 43/2401; E02D 3/11; E02D 31/14; H05B 2214/03; H05B 6/36; H05B 6/108
See application file for complete search history.

(56) References Cited

U.S. PATENT DOCUMENTS

| | | | |
|---|---|---|---|
| 2,472,445 A | | 6/1949 | Sprong |
| 2,771,140 A | * | 11/1956 | Barclay .................... E21B 36/02 166/256 |
| 3,678,249 A | * | 7/1972 | Lennox .................... H05B 3/48 219/544 |
| 5,229,898 A | | 7/1993 | Fujisawa et al. |
| 6,023,554 A | | 2/2000 | Mnegar et al. |

(Continued)

FOREIGN PATENT DOCUMENTS

| | | |
|---|---|---|
| EP | 0516881 A1 | 12/1992 |
| WO | 2016178046 A1 | 11/2016 |

*Primary Examiner* — Amber R Anderson
*Assistant Examiner* — Stacy N Lawson
(74) *Attorney, Agent, or Firm* — Holzer Patel Drennan

(57) ABSTRACT

A heating device for heating underground soil comprising a work-coil housed in a conductive casing, wherein when at least one driving current is supplied to the work-coil, whereby the work-coil generates at least one magnetic field that induces at least one induced current in the casing. The driving currents are of a frequency sufficiently high to cause the induced currents to generate resistance in the casing, thereby increasing the temperature of the casing. A plurality of the heating devices may be arranged in an array to facilitate the heating of a zone of soil.

17 Claims, 11 Drawing Sheets

(56) References Cited

U.S. PATENT DOCUMENTS

| | | |
|---|---|---|
| 6,543,539 B1 | 4/2003 | Mnegar et al. |
| 8,371,371 B2 | 2/2013 | Diehl et al. |
| 9,839,075 B1 | 12/2017 | Sokryukin et al. |
| 2008/0078551 A1 | 4/2008 | Devault et al. |
| 2013/0192825 A1 | 8/2013 | Parsche |
| 2013/0206748 A1 | 8/2013 | Mnegar et al. |
| 2014/0246193 A1 | 9/2014 | Wollen |
| 2015/0167436 A1 | 6/2015 | Frederick et al. |
| 2016/0053596 A1 | 2/2016 | Rey |
| 2019/0009314 A1 | 1/2019 | Park et al. |

\* cited by examiner

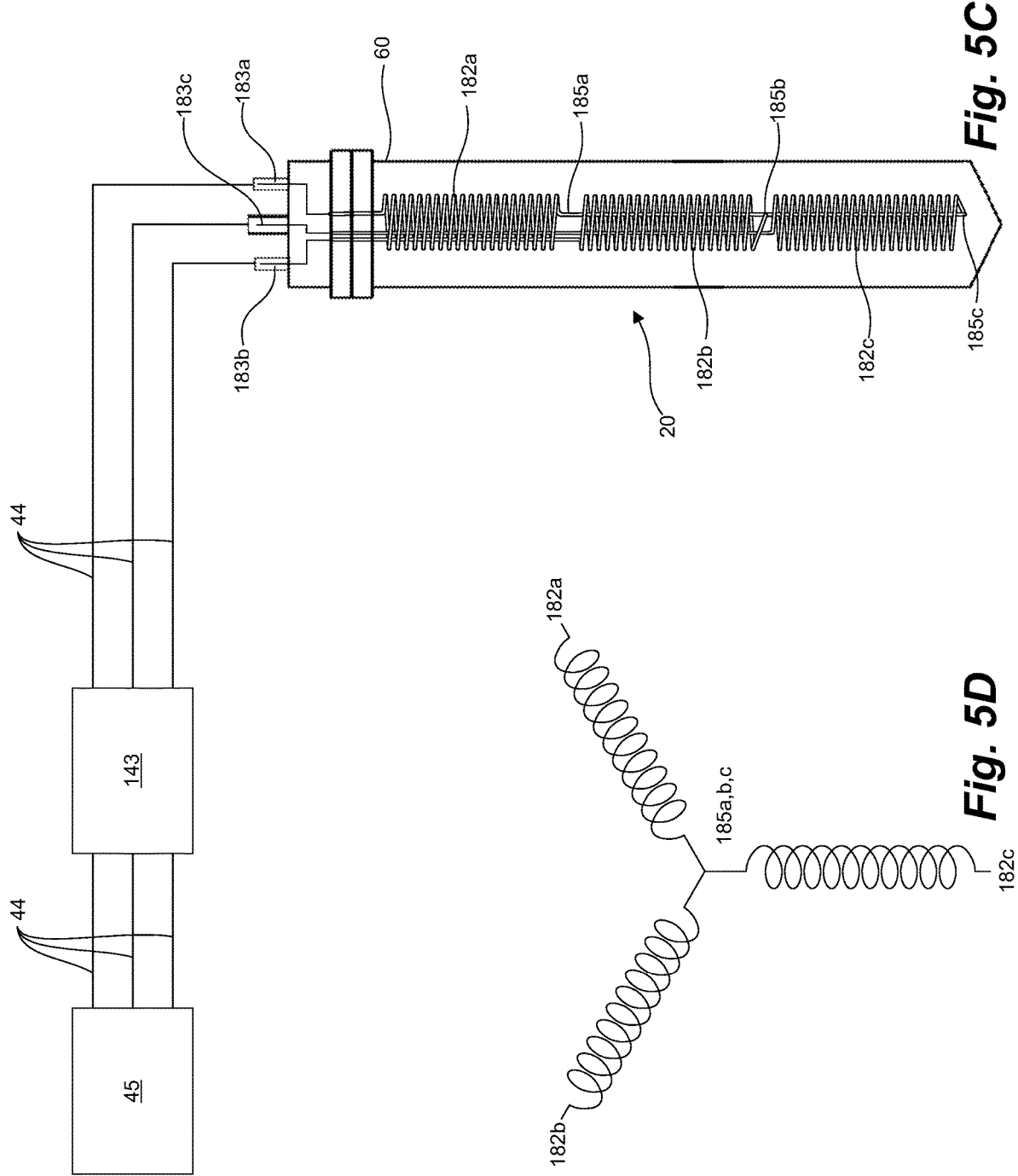

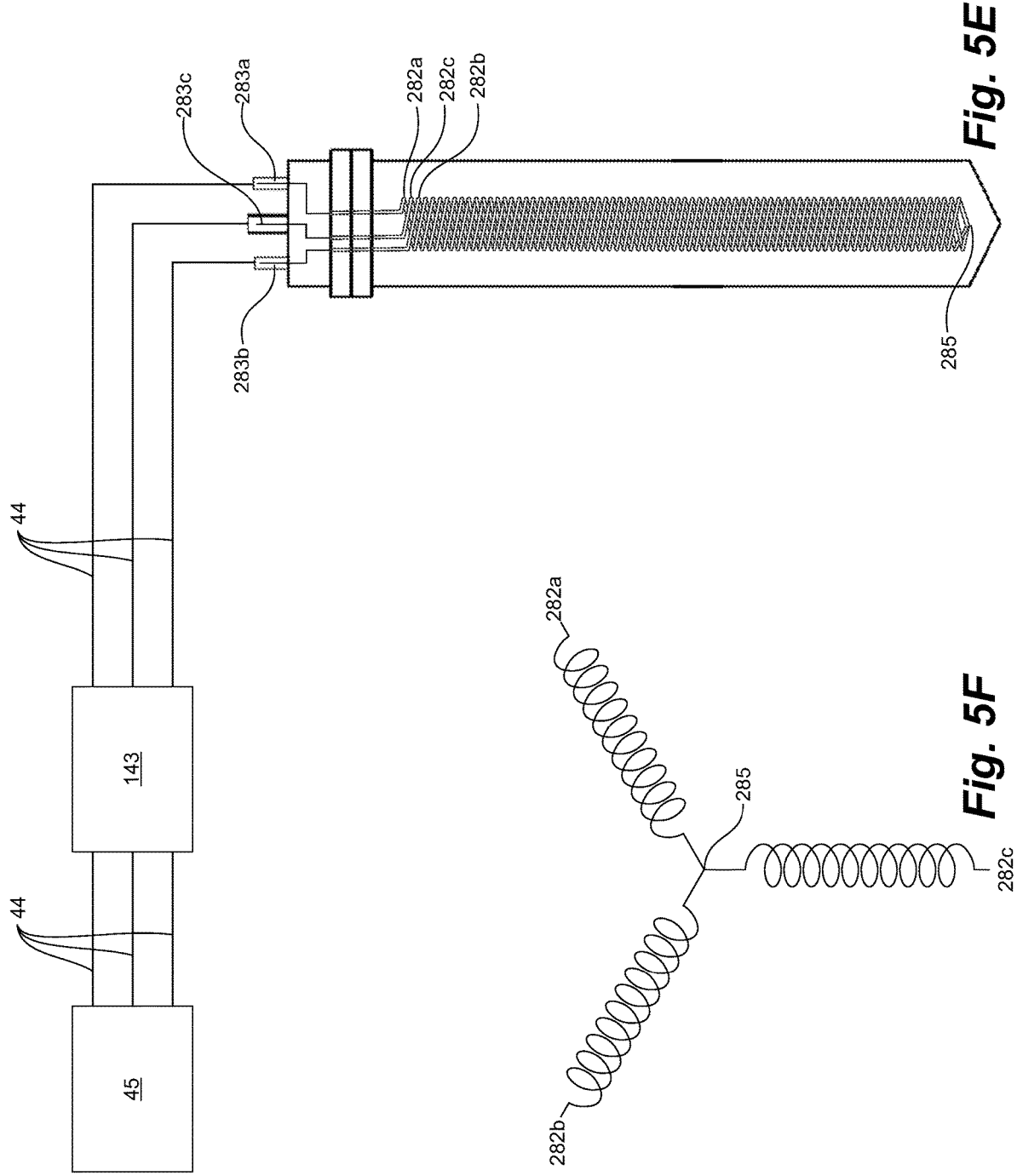

ELECTROMAGNETIC INDUCTION HEATER

CROSS REFERENCES

This Application claims the benefit of U.S. Provisional App. No. 62/512,148, entitled "Electromagnetic Induction Heater", and filed on May 29, 2017, which is hereby incorporated by reference in its entirety.

TECHNICAL FIELD

An apparatus for heating soil, such as for soil/environmental remediation or hydrocarbon recovery, is provided. More particularly, a device utilizing electro-magnetic induction to generate heat is provided for introducing heat into soil to facilitate the removal of contaminants and/or mobilization of hydrocarbons.

BACKGROUND

Contaminated soils are a significant environmental and safety concern. Many contaminants have the ability to flow into aquifer systems, thereby contaminating the public water supply. The depth at which some contaminants occur renders the use of excavation prohibitively expensive. Therefore, methods are employed to remove contaminants in-situ, where depth is not a factor. Such methods include heating the soil using electricity or combustion means in order to vaporize contaminants, which are subsequently extracted from the soil.

Methods of heating the soil are also utilized in connection with heating subterranean heavy oil reservoirs or bitumen deposits to reduce the viscosity of the hydrocarbons so that it can be recovered more easily.

Current soil heating technologies are based on the following principles: (1) passing an electric current through heater elements to heat the soil through conduction, (2) combustion of fuel inside an underground pipeline, and (3) passing an electric current through the soil between several electrodes, wherein heat is generated through Joule heating of the soil. For example, see Applicant's Electro-Thermal Dynamic Stripping Process (ET-DSP)™ technology disclosed in U.S. Pat. No. 6,596,142.

For the electric heater element and combustion heating technologies, cost considerations limit the heating elements and pipelines to a small diameter. Additionally, it is difficult to control the boundary temperature throughout the vertical extent of the wellbore for selective heating of different vertical extents of the element/pipeline to different temperatures. Further, the heating equipment used in such operations are sunk costs, as they are typically left in the ground after a remediation project is completed. ET-DSP™ and similar technologies are only capable of remediation of a limited number of contaminants, as the soil temperature is limited to the boiling point of water, which can be less than the temperatures needed to achieve thermal remediation of certain types of contaminants.

There is a need for an economical method and device for heating soil that provides a large heating surface area, enables the selective heating of vertical extents of the element to different temperatures, and is capable of achieving soil temperatures sufficient to remediate contaminants with high boiling points, while allowing for recovery of at least some of the heating equipment after operations have concluded.

SUMMARY OF THE INVENTION

In accordance with a broad aspect of the present disclosure, there is provided a heating device for heating underground soil comprising: a conductive casing having a first end, a second end, and a wall defining an inner bore extending the first and second ends, and a temperature; a conductor, at least a part of the conductor being positioned in the inner bore, the conductor being electrically insulated from the casing; and a power unit connected to the conductor through the first end, the power unit configured to convert power received from a power source into at least one driving current and supply the at least one driving current to the conductor, wherein the conductor is configured to generate at least one magnetic field when the at least one driving current is supplied thereto to create at least one corresponding induced current in the casing, and wherein the at least one driving current is of a frequency sufficient for the at least one induced current to encounter resistance in the casing to increase the temperature.

In accordance with another broad aspect of the present disclosure, there is provided a system for heating one or more subterranean zones of soil comprising: a plurality of heating devices arranged in a array, wherein each heating device comprises: a conductive casing having a first end, a second end, and a wall defining an inner bore extending the first and second ends, and a temperature; a conductor, at least a part of the conductor being positioned in the inner bore, the conductor being electrically insulated from the casing; and a power unit connected to the conductor through the first end, the power unit configured to convert 50/60 Hz power received from a power source into at least one high-frequency driving alternating current and supply the at least one driving current to the conductor, wherein the conductor is configured to generate at least one magnetic field when the at least one driving current is supplied thereto to create at least one corresponding induced current in the casing, and wherein the at least one driving current is of a frequency sufficient for the at least one induced current to encounter resistance in the casing to increase the temperature.

In accordance with another broad aspect of the present disclosure, there is provided a method of heating one or more subterranean zones of soil comprising: supplying at least one alternating driving current each having a frequency to a respective at least one conductive coil housed inside a conductive casing, the at least one conductive coil being electrically insulated from the conductive casing, and the conductive casing being positioned in the one or more subterranean zones; and inducing at least one induced current in the conductive casing, wherein the frequency is selected to cause the at least one induced current to generate resistance in the conductive casing to increase a temperature of the conductive casing.

DESCRIPTION OF THE DRAWINGS

The invention will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

FIGS. 1A to 1C are collectively referred to herein as FIG. 1;

FIGS. 3A to 3C are collectively referred to herein as FIG. 3;

FIG. 5C is a schematic representation of the heating device of FIG. 5B showing the work coils of the three-phase conductor;

FIG. 5D is a simplified schematic representation of the heating device of FIG. 5C illustrating the wye connection between the work coils;

FIG. 5E is a schematic representation of a heating device having a three-phase inverter and a three-phase conductor having three interleaved work coils;

FIG. 5F is a simplified schematic representation of the heating device of FIG. 5E illustrating the wye connection between the work coils. FIGS. 5A to 5F are collectively referred to herein as FIG. 5;

DESCRIPTION OF EMBODIMENTS

Figure 1A:
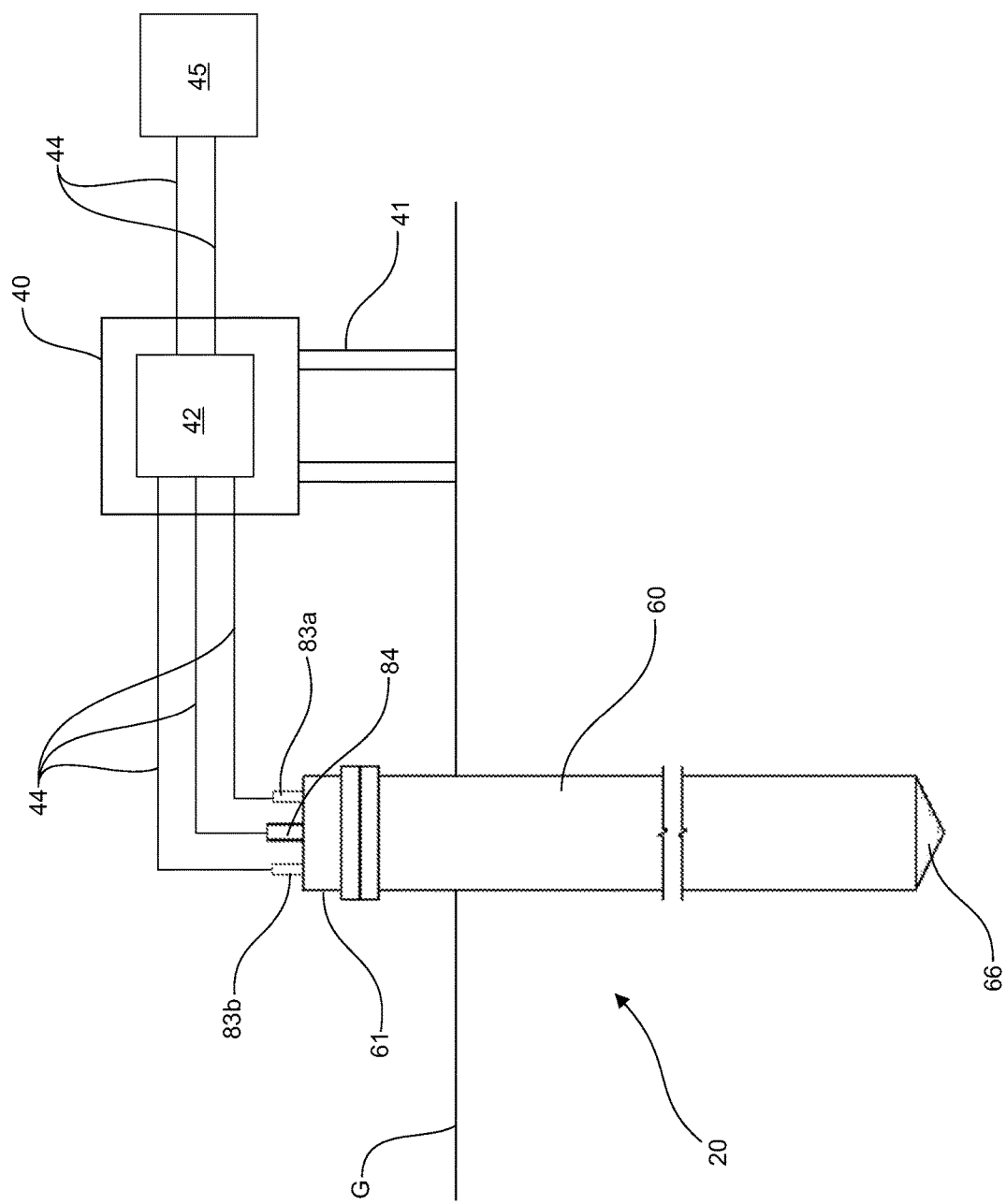
FIG. 1A is a schematic representation of a heating device according to embodiments herein.

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the scope of the invention, as defined in the appended claims.

A heating device configured to convert electromagnetic energy to thermal energy is provided. One application of the heating device is for the heating of soil, such as for in-situ soil remediation or recovery of bitumen and heavy oils from underground reservoirs. In embodiments, the electrical quality factor (Q) of the heating device (work-coil inside a conductive casing and an external capacitor) is sufficiently low to provide stable operating conditions and a high efficiency of the transfer of electromagnetic energy to thermal energy on the casing over a wide operating frequency range. Consequently, the input power deliverable to the heater element is greater than that presently achieved with prior art technology.

The operation of the heating device is based on Faraday's law of electro-magnetic induction. In particular, in embodiments, the heater element of the heating device is a conductive casing that is heated by the induction of an electric current within the casing wall as a result of the passing of an alternating current through a work-coil located inside the casing, wherein the alternating current possesses a frequency that is sufficient to exploit the skin-effect. The skin-effect limits the penetration of current into the casing wall such that the induced current is confined to a very thin layer of the casing and, given a work-coil in helical form, the induced current flows in a circumferential direction in the casing wall. In other words, the current density in the casing is highest near the inner surface of the casing. The skin-effect results in establishing an appreciable resistance in the casing, under which the passage of the induced current through the resistance generates heat.

In a remediation operation, a plurality of heating devices may be arranged in a pattern (also referred to as an "array"). Each heating device comprises a heater element, for example a conductive casing, that is water-tight and contains a work-coil, for example, one or more internal work-coils, extending lengthwise therein. Work-coils are connected to a power unit, which may comprise one or more rectifiers and inverters that convert power delivered thereto, for example by a utility service, into a high frequency alternating current. The power unit can also comprise one or more capacitors for creating circuit resonance with one or more work-coils during operation to provide efficient use of electrical energy during operation. The heating device may also be equipped with apparatus to monitor and regulate the temperature along the heater element. The alternating current is delivered to the work-coil to produce an alternating axial magnetic field, in turn inducing a corresponding alternating circumferential electric current in the wall of the conductive casing. The work-coil and other electronic components of the heating device may be recoverable for reuse after the soil heating operations are completed.

Figures 1B, 1C:
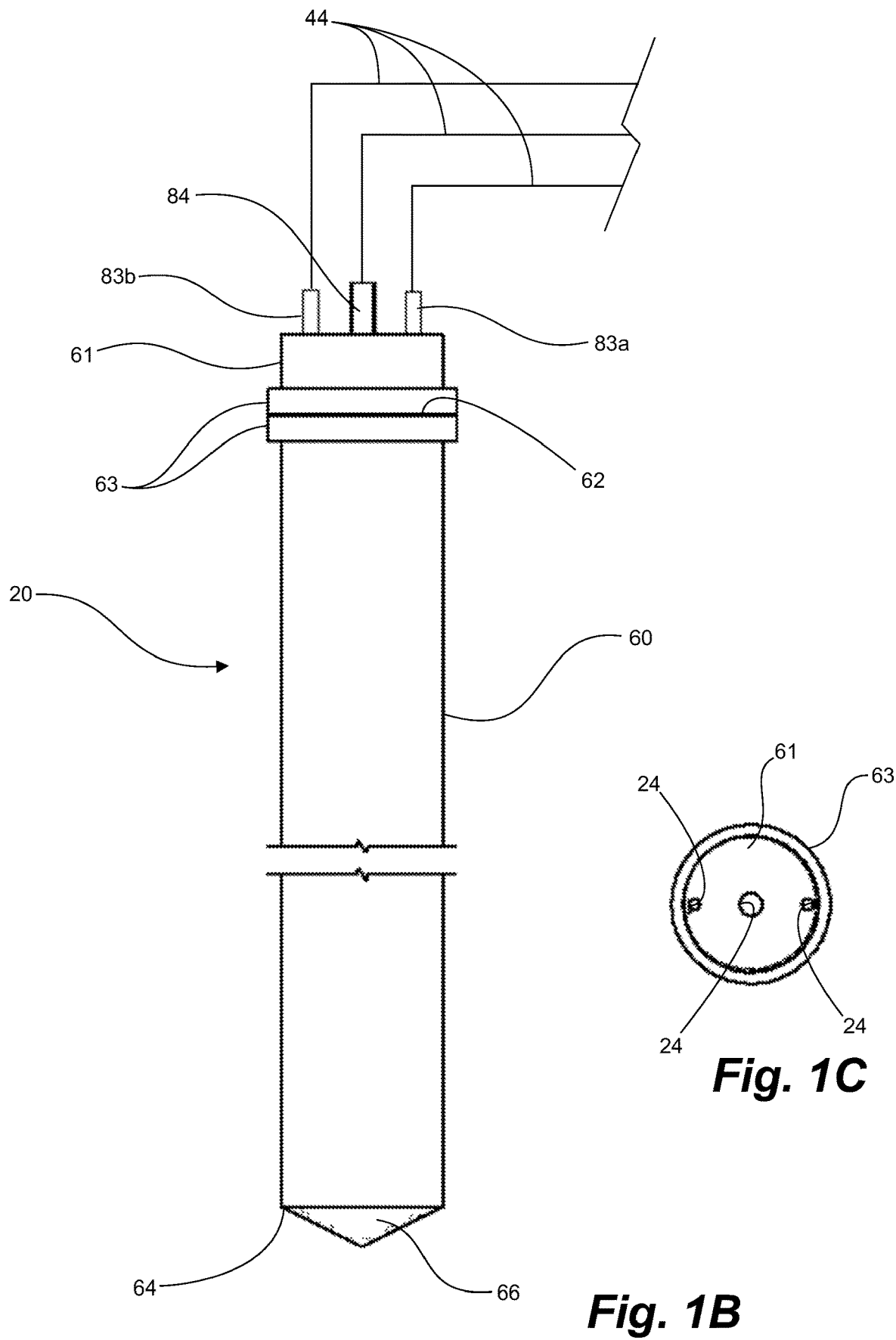
FIG. 1B is a side plan view of the heating device of FIG. 1A with parts omitted.
FIG. 1C is a top plan view of the heating device of FIG. 1B.
Figure 2:
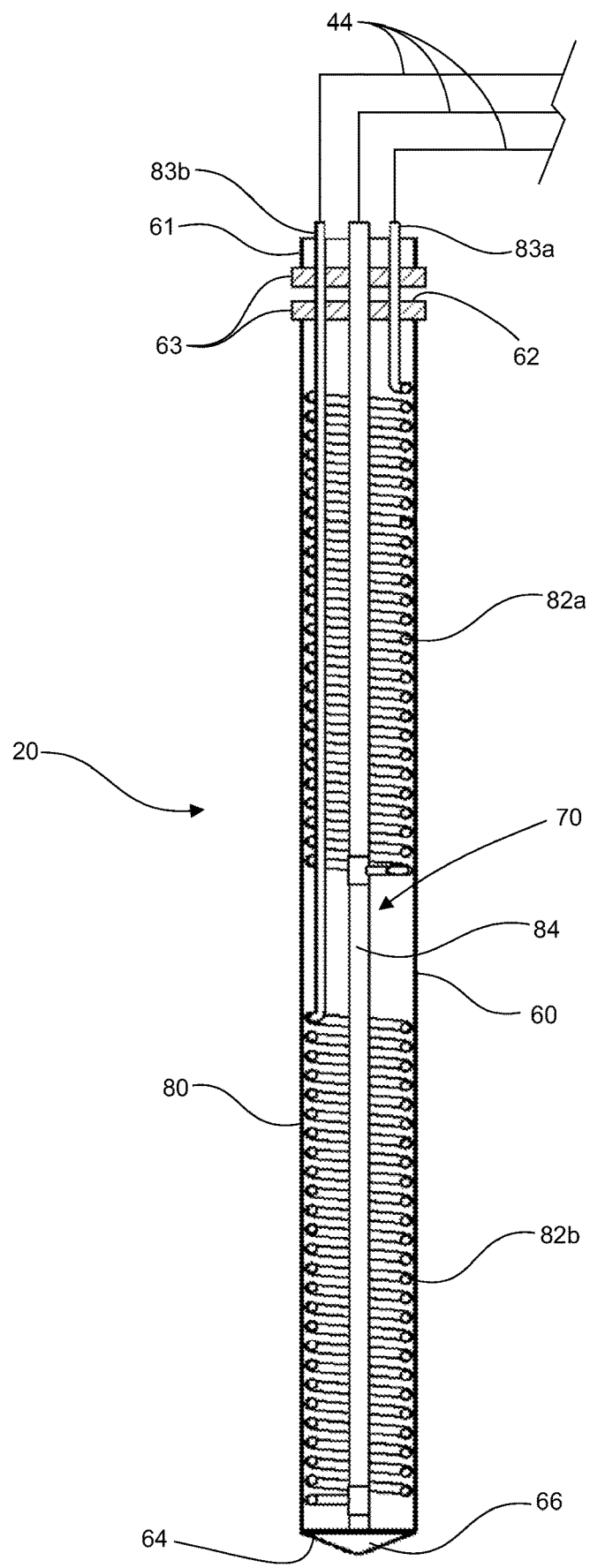
FIG. 2 is a cross-sectional view of the heating device of FIG. 1B.

In a broad aspect of the present disclosure, with reference to FIGS. 1 and 2, a heating device 20 is provided having a conductor 80 housed inside a heater element, which in the illustrated embodiment is a tubular conductive casing 60. The conductor 80 is connected a power unit 42. Power unit 42 may comprise one or more inverters 43, rectifiers, and capacitors. Casing 60 can be closed at a lower end 64 such that the interior of the casing is isolated from particulates and fluids in the soil to be heated. The conductor 80 receives at least one driving electric current from the power unit 42. The driving electric current is an alternating current which, when supplied to the conductor 80, causes the conductor 80 to generate a magnetic field thereabout. The generated magnetic field in turn induces an induced electric current in the wall of the casing 60. The frequency of the first current and the material properties of the casing 60 can be selected to generate heat in the casing wall which can then be transferred to the surrounding soil when the heating device 20 is underground. The heat generated by the heating device 20 can be used to facilitate soil remediation by vaporizing contaminants, and/or bitumen/heavy oil recovery by mobilizing nearby hydrocarbon deposits in subterranean formations.

In embodiments, power unit 42 is housed inside an electrical enclosure 40 situated near casing 60. Referring to FIG. 1A, enclosure 40 may be situated above ground G. In one embodiment, enclosure 40 is supported by an enclosure stand 41 so that the enclosure is at a distance above ground. The electric enclosure 40 is configured to allow electrical communication between the power unit 42 and the conductor 80 and between the power unit 42 and an external power source 45, such as a transformer configured to receive power from a utility and output power at a voltage appropriate to be delivered to the power unit 42. A rectifier is used to convert the utility alternating current received from power source 45 to a direct current, and an inverter can be used to convert the direct current from the rectifier to a high-frequency driving alternating current having a desired frequency. One or more capacitors can be provided in the power unit 42 to permit circuit resonance in response to a driving current provided at a resonant frequency of the electric circuit of the heating device 20, thus enabling efficient operation.

The heating device 20 may include a controller (not shown) configured to receive inputs from one or more sensors (not shown) located along casing 60 and control the at least one high-frequency driving alternating current from the power unit 42 for optimum heat output in response to data received from the sensors. The heating device 20 may further comprise alarms for notifying an operator of abnormal operating conditions and/or equipment failure, and/or telemetry components to enable remote control and operation of the heating device 20. One or more of the controller, sensors, alarms, and telemetry components may be housed in the enclosure 40.

In an embodiment, as best shown in FIGS. 1 and 2, conductive casing 60 of the heating device 20 is an elongated tubular member having a first (upper) end 62, a second (lower) end 64, and an inner bore 70 extending therebetween. In embodiments, upper end 62 is open and configured to sealingly connect to an upper cap 61, such as via a flange connection 63 or threaded connection (not shown). In embodiments, upper cap 61 is made of carbon steel, stainless steel, or other suitable materials, and/or filled with refractory mortar for electrical and thermal insulation. In some embodiments, the interface between the upper cap 61 and upper end 62 may further comprise a gasket (not shown) configured to provide a thermal barrier. The gasket may include refractory material. Upper cap 61 has apertures 24 defined therein to allow electrical connections therethrough. In some embodiments, portions of the conductor 80 are received through apertures 24 and extend beyond the upper surface of cap 61 for connection to other components of the heating device 20, which will be described in detail below. Alternatively, electrical connectors, such as high-frequency feed cables 44, can extend from above cap 61 through apertures 24 and into casing 60 to connect with the work-coil 80 inside casing 60. In the depicted embodiment, lower end 64 is closed, for example by welding a bottom cap 66 thereto, such that the inner bore 70 of casing 60 is isolated from external particulates and fluids during operation.

Casing 60 is made of a conductive material, for example one with relatively high-permeability and low-conductivity (i.e., high resistivity), such as carbon steel, which possesses a relative permeability of 100, in order to benefit from the skin-effect as explained below. Casing 60 can be made of any other ferrous material having a relative permeability suitable to limit skin depth to such an extent that the resulting resistance to the current induced in casing 60 generates the desired amount of heat. For example, casing materials with a relative permeability ranging from 100 to 2000 would be acceptable. When casing 60 is made of a material as described above and is cooperatively used with the work-coil 80 and capacitor 47*a*, 47*b*, as shown for example in FIG. 5A, the result is a low Q-value circuit that is able to resonate in response to a wider range of frequencies. In embodiments, a refractory mortar can be applied to the inner wall of casing 60 to electrically and thermally insulate casing 60 from the work-coil 80. Alternatively, refractory mortar can be applied to work-coil 80 to electrically insulate it from casing 60. The mortar is preferably refractory such that it does not break down under heat, which may compromise the insulation between the work-coil 80 and casing 60. The wall thickness of casing 60 should be greater than one skin depth, yet thin enough such that the casing 60 may reach the desired temperature in a reasonable amount of time when the heating device 20 is in operation. In an exemplary embodiment, casing 60 is a 6-inch diameter steel pipe having a wall thickness of about ⅛ inch, with an about 1.5 mm (¹⁄₁₆ inch) thick coating of suitable electrical insulating refractory material on the inner wall. Casing 60 may be of any length, depending on the application and the depth of the subterranean zone to be heated. In some embodiments, casing 60 may be connected to utility ground for electrical safety.

Figure 3A:
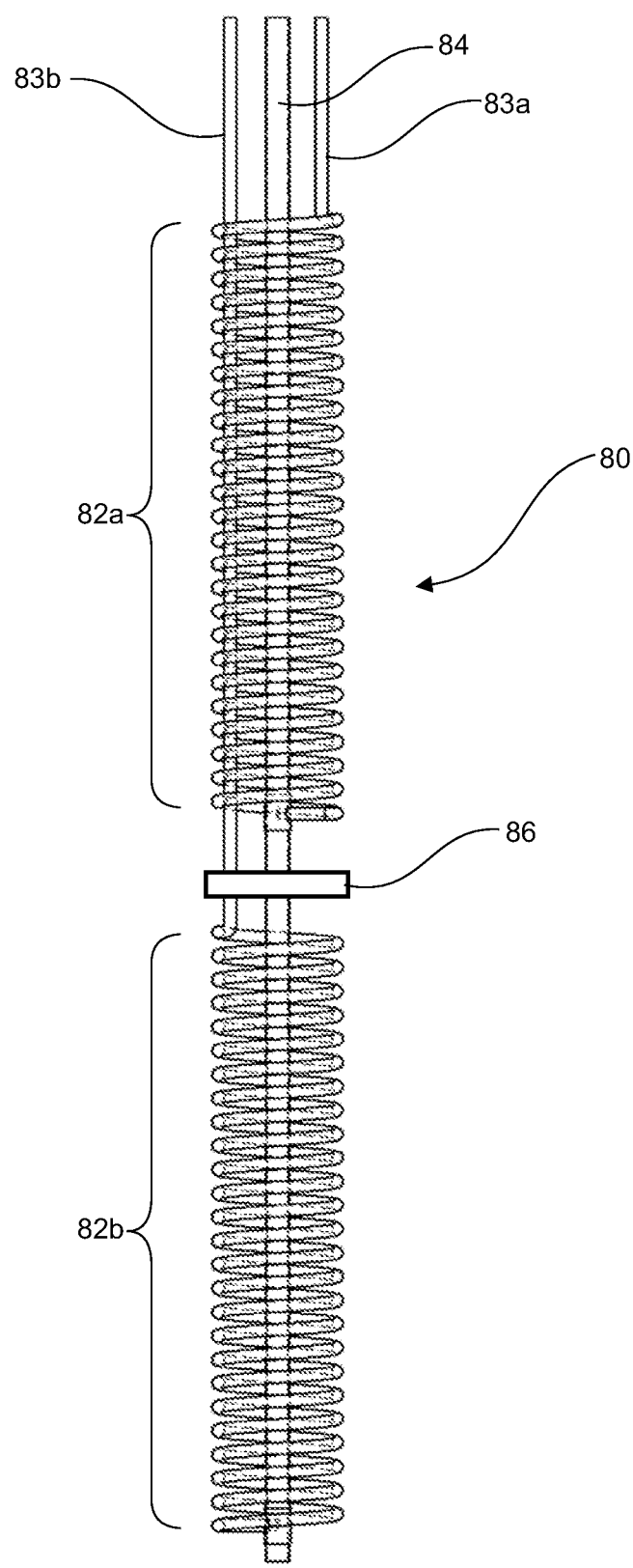
FIG. 3A is a side plan view of a conductor usable in the heating device according to embodiments herein.
Figure 3B:
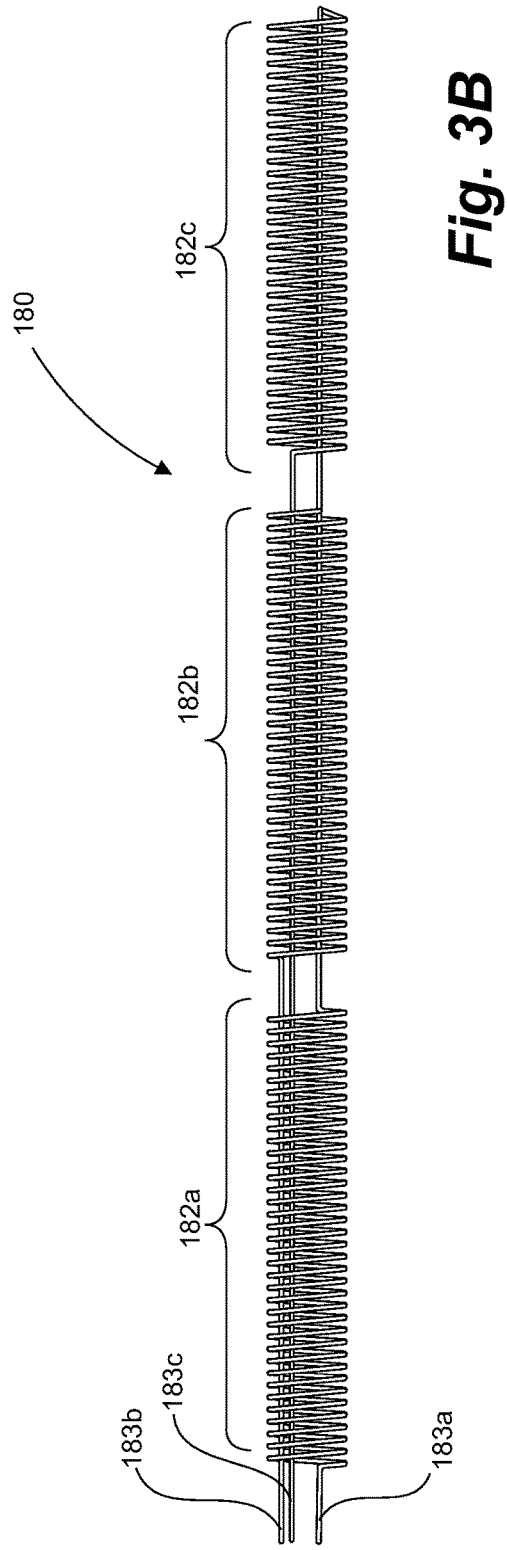
FIG. 3B is a side plan view of another conductor usable in the heating device according to embodiments herein.
Figure 3C:
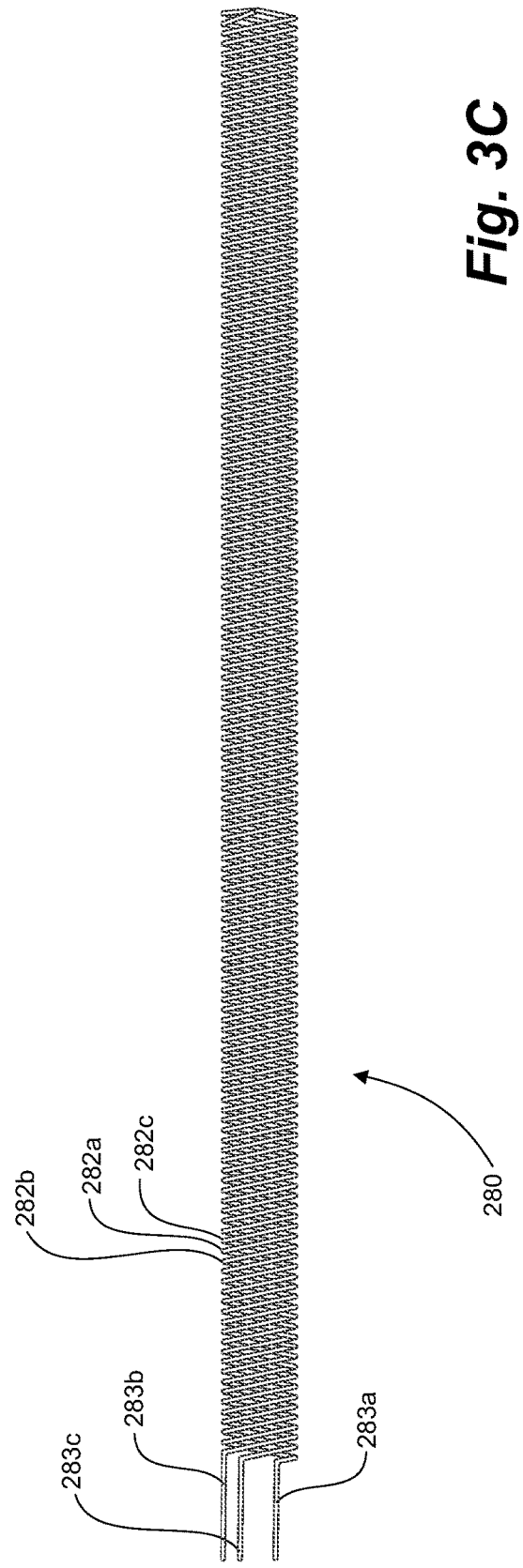
FIG. 3C is a side plan view of yet another conductor usable in the heating device according to embodiments herein.

With reference to FIGS. 1 and 2, work-coil 80 is housed within casing 60 and extends axially along a length of inner bore 70. In embodiments, work-coil 80 is positioned substantially coaxially and concentrically relative to casing 60. One or more centralizers may be used to help maintain the work-coil's position inside casing 60. Work-coil 80 is connected via electrical connectors to the power unit 42. In embodiments, work-coil 80 is made of copper, nickel, or other suitable high temperature conducting materials known in the art. In some embodiments, as shown in FIGS. 2 and 3A, work-coil 80 comprises one or more work coils 82*a*, 82*b* and a linear return portion 84 extending along the central opening thereof and connected to one end of each of the work coils 82*a*, 82*b*. A centralizer 86 can be supported on the work-coil 80 to help center same with respect to the casing 60. In the embodiment depicted in FIG. 3A, the centralizer 86 is supported on the return portion 84 and positioned in between work coils 82*a*, 82*b*. Of course, the centralizer 86 may be positioned elsewhere on the work-coil 80 and more than one centralizer may be used.

Each work coil 82*a*, 82*b* is configured to receive and be energized by a respective high-frequency driving alternating current from the power unit 42 (i.e. a driving current produced by one of the inverters). In the illustrated embodiment, work coils 82*a*, 82*b* each have an upper connecting portion 83*a*, 83*b*, respectively, for electrical communication with the power unit 42 via an electrical connector 44, such as a feed cable. In the illustrated embodiment, the upper connecting portion 83*a*, 83*b* is the free end of the work coil 82*a*, 82*b*. The upper end of the return portion 84 is also in electrical communication with the power unit 42 via an electrical connector 44. In the embodiment shown in FIGS. 1A and 2, the upper end of the return portion 84 and the upper connecting portions 83*a*, 83*b* are received through apertures 24 and extend beyond the upper surface of upper cap 61 to connect to electrical connectors 44 outside casing 60.

When energized by the high-frequency driving alternating current, work coils 82*a*, 82*b* each generate a magnetic field thereabout. In some embodiments, work coils 82*a*, 82*b* are conductive helical coils which provide a large surface area for carrying a large quantity of high-frequency driving alternating current, thereby reducing electric losses introduced by the skin-effect. Each work coil 82*a*, 82*b* may have a generally circular or rectangular cross-section and may be made of hollow or solid tubing, such as copper tubing.

Work coils 82*a*, 82*b* each extend along at least a portion of the length of inner bore 70 and each can be selectively situated at a different axial location of the inner bore 70 for heating a different stratum of soil. In one example, work coil 82*a* may be positioned above and spaced apart at some distance from work coil 82*b*. While two work coils are shown in FIGS. 2 and 3A, the heating device 20 may comprise other numbers of work coils and the inverters 43 may be selected such that the magnitude of the high frequency driving alternating current received by each work coil 82 is the same or different than those received by the other coils 82. Accordingly, a temperature gradient can be established across casing 60 and the heating device 20 may be configured to allow different lengthwise portions of the casing 60 to be selectively heated to different temperatures suitable for the soil composition and contaminants present in the various zones and/or strata. For example, the heating device 20 can be configured to only heat up a particular zone and/or stratum to the temperatures necessary to remediate the contaminants therein, which may result in more efficient usage of energy. As energy usage accounts for about one-third of the cost of a remediation project, the cost savings associated with such an operation can be significant.

Figures 5A, 5B:
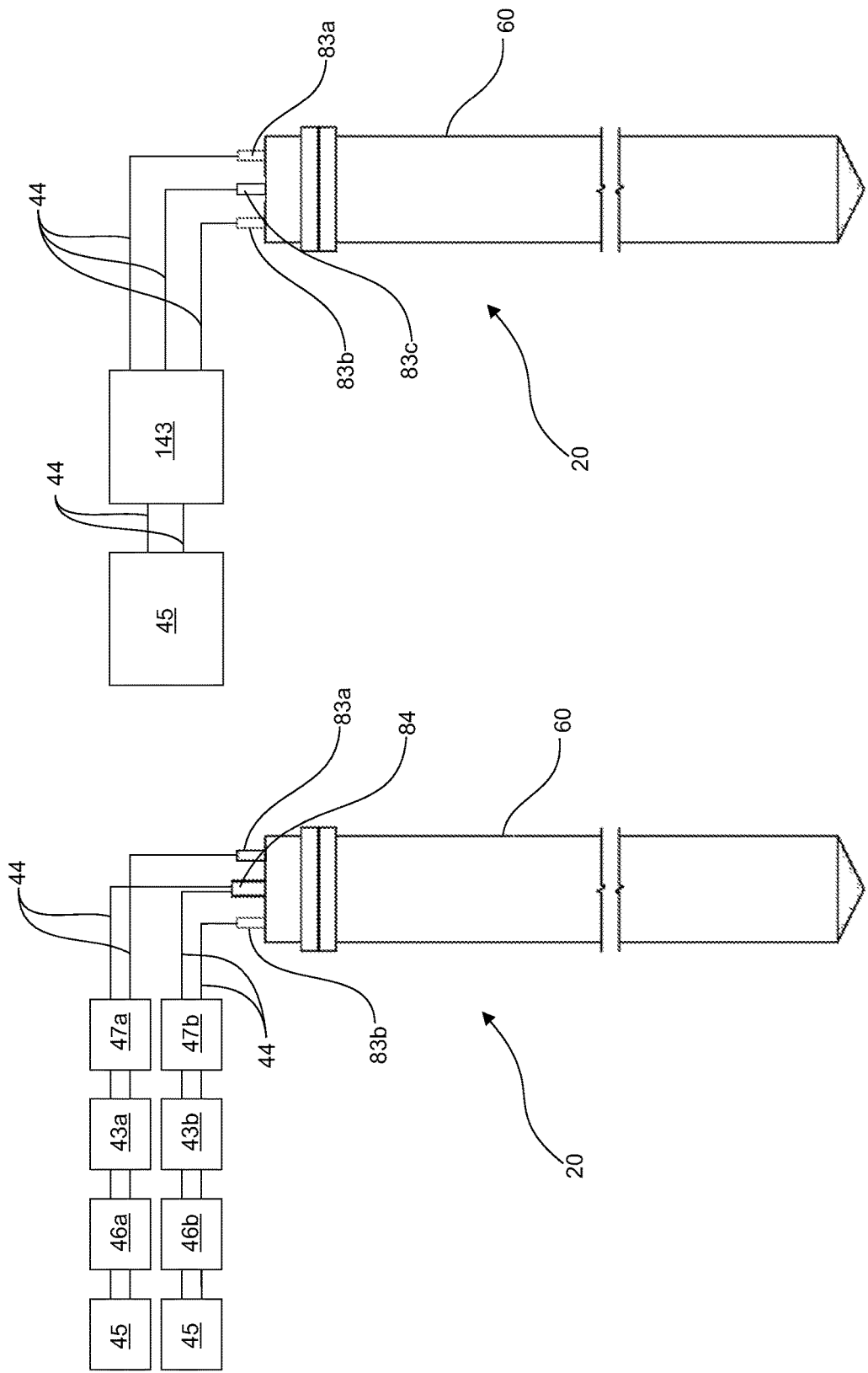
FIG. 5A is a schematic representation of a heating device having multiple single-phase inverters according to embodiments herein.
FIG. 5B is a schematic representation of a heating device having a three-phase inverter according to embodiments herein.

FIGS. 3B, 3C, and 5B-5F show sample conductors that may be used with three-phase inverters. Such conductors are referred to as "three-phase conductors". Three-phase conductors 180 and 280 are configured for delta or wye connections, as shown in FIGS. 5D and 5F. Therefore, a three-phase conductor 180, 280 has three (or multiples thereof) work coils 182a, 182b, 182c arranged axially in series or three (or multiples thereof) interleaved work coils 282a, 282b, 282c, each with a separate connecting portion 183a, 183b, 183c, 283a, 283b, 283c, for connection to the power unit 42. In the embodiment shown in FIGS. 3B, 5C, and 5D, conductor 180 comprises three work coils 182a, 182b, 182c arranged axially in series, each work coil terminating at a respective electrically equivalent nodes 185a, 185b, 185c. In another embodiment, shown for example in FIGS. 3C, 5E, and 5F, conductor 280 comprises three work coils 282a, 282b, 282c that are interleaved, extend along about the same axial length of the inner bore 70, and terminate at common node 285.

Accordingly, multiple single-phase work coils or a three-phase work coil can be constructed by: (i) having a series of independent work coils along the length of inner bore 70, as shown for example in FIGS. 3A and 3B; or (ii) by having three work coils, or multiples thereof, arranged axially in series or interleaving the windings of three work coils, or multiples thereof, as shown for example in FIGS. 3B and 3C.

In instances where the casing 60 is long and the remediation site is deep underground, the operating voltage of the work coil 82 may be quite high, which poses a greater danger to personnel operating the heating device 20 and also increases the risk of arcing. In such instances, use of a three-phase conductor 180, 280 may be desirable such that the lengths of the work coils 182a, 182b, 182c, 282a, 282b, 282c do not become too long, and thus the operating voltage of the work-coils 180, 280 can be maintained at a modest level. For example, if an 18 meter (60-foot) work coil is required to heat a remediation site, the voltage required to sufficiently heat the site is about 400 volts to 500 volts. If three 6 m (20-foot) work coils connected to a three-phase inverter are used instead, only about 250 volts must be supplied to each coil in order to sufficiently heat the remediation site. An alternative to the three-phase embodiment above is to simply provide three 6 m (20-foot) single-phase work coils to heat the remediation site.

Figure 4:
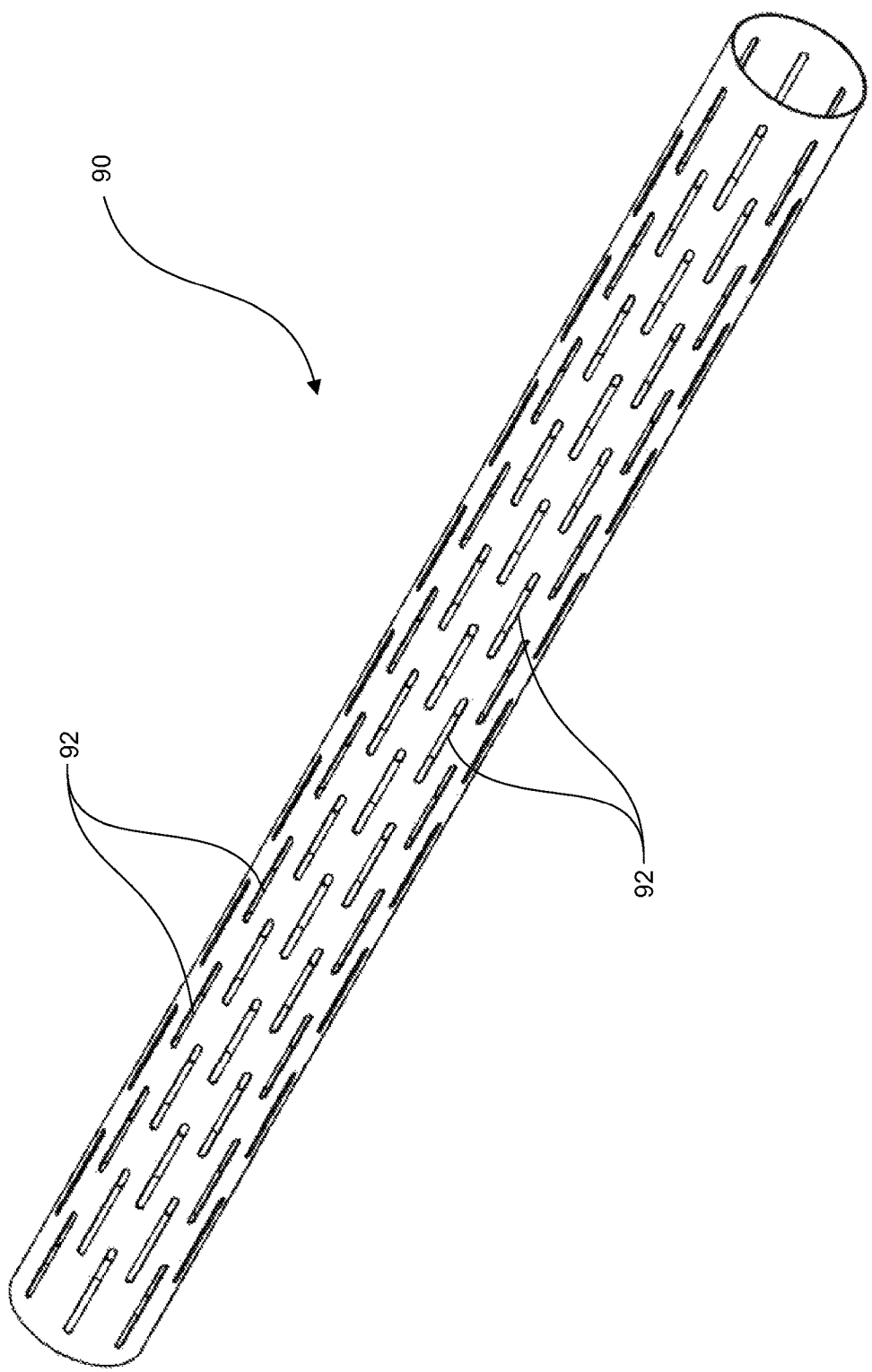
FIG. 4 is a perspective view of a sample work coil support usable in the heating device according to embodiments herein.

In some embodiments, the work-coil(s) 80 are wound and supported on a work-coil support 90, shown in isolation in FIG. 4. Support 90 may be substantially coaxially and concentrically positioned inside the work-coil(s) and/or casing 60. In some embodiments, one or more centralizers are used to help center the support 90 inside the work-coil(s) and/or the casing 60. For example, a centralizer may be supported on each end of the support 90 to help maintain its coaxial position relative to the work-coil(s) and/or casing 60. Work-coil support 90 can be made of electrically insulated material or coated with electrically insulated material, such as refractory material, so as to interrupt eddy currents induced by the work-coil 80, such that energy from the work-coil 80 is not lost to the heating of the support 90 via induction instead of the casing 60. In a sample embodiment, work-coil support 90 is a metal tubular, such as a steel cylinder or a stainless-steel wire mesh rolled into a tubular shape, coated on its outer surface with a suitable refractory material to electrically insulate the support 90 from the work-coil(s). In an exemplary embodiment, the support 90 has a wall thickness of approximately 1.5 mm (1/16 inch). In the illustrated embodiment, work-coil support 90 has a plurality of perforations 92 defined in its wall which function to further interrupt eddy currents and mitigate the induction of current in the support 90 by work-coil 80.

FIGS. 5A and 5B show sample embodiments of the heating device 20. In some embodiments, the power unit 42 comprises one or more inverters 43, each equipped with a rectifier 46a, 46b for receiving three-phase electric current from at least one external power source 45 and converting it into a direct current, which is subsequently converted by the inverter 43 into a high-frequency single-phase or three-phase alternating current to be supplied to work coil 80, 180, 280. The high frequency driving alternating current produced by the inverters 43 may range, for example, from about 100 volts to about 300 volts, and from about 2 kHz to about 50 kHz. Each inverter 43 may be a single-phase inverter or a three-phase inverter such that the power unit 42 may be configured to generate multiple single-phase or three-phase high-frequency driving alternating currents. In embodiments, at least one capacitor 47a, 47b is arranged in series or parallel with each inverter 43a, 43b to achieve circuit resonance.

In the sample embodiment shown in FIG. 5A, the power unit 42 comprises two single-phase inverters 43a, 43b, each of which receives direct current power from a rectifier 46a, 46b which, in turn, is supplied current from an alternating current power source 45. Each of the inverters 43a, 43b converts the 50/60 Hz alternating current from the power source 45 into a high-frequency single-phase driving alternating current. The inverters 43a, 43b are connected to a single-phase work-coil 80, which may comprise one or more respective work-coils 82a, 82b as shown for example in FIG. 3A. The inverters 43a, 43b supply the converted high-frequency driving alternating current to the work-coil 80 via electrical connectors 44 and connecting portions 83a, 83b, respectively. The high-frequency driving alternating currents flow through the work-coil 80 and return to the inverters 43a, 43b via the return portion 84 and electrical connector 44. While two inverters are shown in FIG. 5A, it can be appreciated that more or fewer single-phase inverters may be used for heating device 20, which may depend on the number of work-coils 80 and/or the size of casing 60.

FIGS. 5B, 5C, and 5E show another sample embodiment wherein the power unit 42 of heating device 20 comprises a three-phase inverter 143 having rectifiers therein, which receives 50/60 Hz power from the alternating current power source 45 and converts same into a three-phase high-frequency driving alternating current. The three-phase inverter 143 is connected to a three-phase conductor 180, 280, for example as described above with respect to FIGS. 3B and 3C. The inverter 143 also comprises one or more capacitors for achieving circuit resonance. The three-phase inverter 143 supplies the converted high-frequency driving alternating current to the work-coil 180, 280 via electrical connectors 44 and connecting portions 183*a*, 183*b*, 183*c*, or 283*a*, 283*b*, 283*c*, respectively. As the work coils of the conductor 180, 280 are arranged in a wye configuration, a return portion 84 is not needed. Of course, if multiple three-phase work-coils 180, 280 are used in a remediation operation, the heating device would include additional three-phase inverters 143 to supply the high-frequency driving alternating current to the conductors 180, 280.

Figure 6:
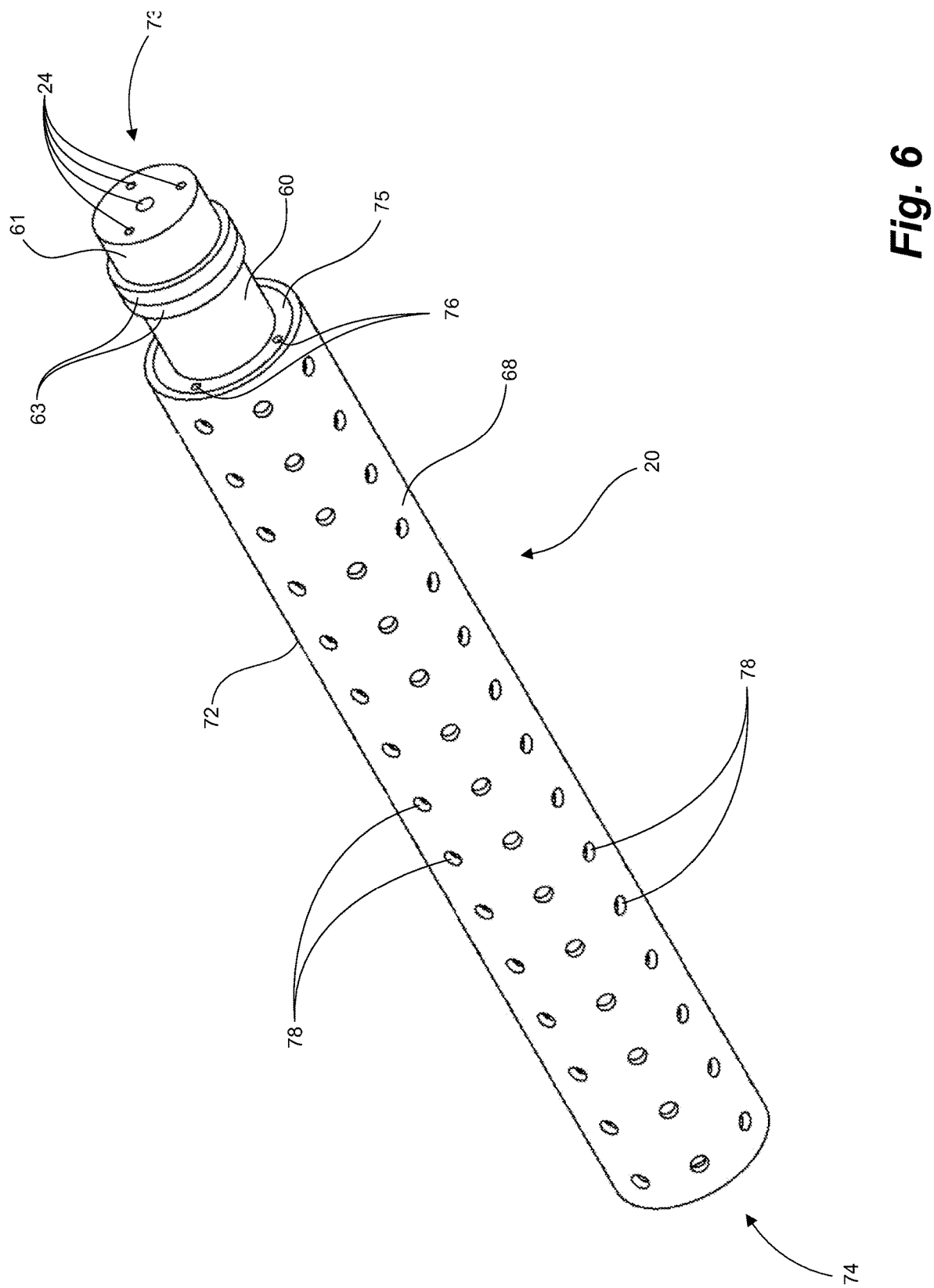
FIG. 6 is a perspective view of an optional outer sleeve supported on the casing of the heating device according to embodiments herein.
Figure 7:
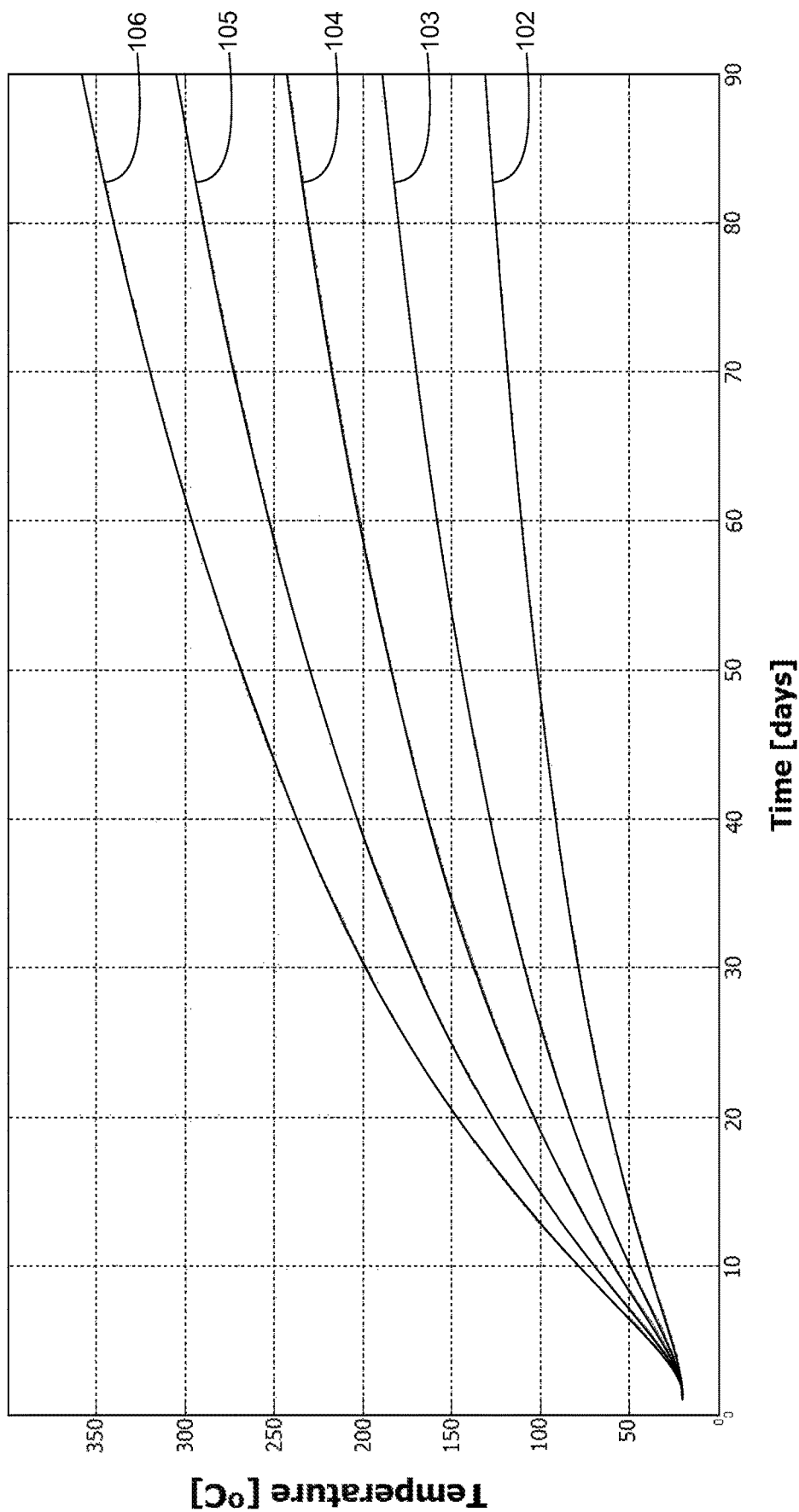
FIG. 7 is a graph illustrating the time required for soil at the centroid of an array of three heating devices arranged in an equilateral triangle to reach various temperatures.

The casing 60 of the heating device 20 can either be in direct contact with the soil or, in some embodiments, be in indirect contact with the soil via an outer sleeve. For example, as shown in FIG. 6, the heating device 20 includes an outer sleeve 72 supported on, and attached to, the casing 60 via annular connections 75 located at first and second ends 73, 74 of the sleeve 72. In embodiments, the annular connections 75 centralize the sleeve 72 to the casing 60 and secure the sleeve 72 thereto, such as via a press fit or welding. In embodiments, the outer sleeve 72 is a tubular having a plurality of perforations 78 along its length, and shaped and sized to fit substantially concentrically and coaxially with casing 60. The inner diameter of the outer sleeve 72 is greater than the outer diameter of casing 60 such that an annulus is defined therebetween. The outer sleeve 72 may be made of steel or other heat conducting materials such as stainless-steel, aluminum, and the like, and the outer sleeve 72 is fitted on to the casing 60 to allow a transport fluid to enter the annulus, for example, from inlet ports 76 at or near the first (or upper) end 73 of the outer sleeve 72, and exit through perforations 78 to promote advection. In the depicted embodiment, inlet ports 76 are formed in the annular connection 75 adjacent the first end 73. The transport fluid may be, for example, air, steam, or water, which can be injected into the annulus via inlet ports 76. The addition of the outer sleeve 72 allows the heating device 20 to heat the surrounding soil by both conduction and convection simultaneously.

In use, power unit 42 provides one or more high-frequency driving alternating currents to the work-coil 80, 180, 280. An alternating axial magnetic field is thereby created about the work-coil(s) 82, 182, 282, which in turn induces a circumferential high frequency driving alternating current in the wall of the conductive casing 60. The frequency of the driving alternating current can be tuned to take advantage of the skin-effect of the induced current in casing 60. Skin depth decreases as the frequency of induced current increases. A small skin depth is desirable because decreasing the cross-sectional area of the casing within which the induced current flow is constrained increases the resistance in the casing 60 encountered by the current. Increasing the resistance in the casing 60 increases the resultant heat generated by the induced current. In a preferred embodiment, the at least one driving current is supplied at a frequency that matches the resonant frequency of the electric circuit, i.e. the one or more capacitors 47*a*, 47*b* connected in parallel or series with the work-coil 80, 180, 280, in order to achieve maximum flow of the induced current in the casing 60. The capacitor 47*a*, 47*b* may be housed in enclosure 40 or included elsewhere in the electric circuit of the heating device 20. Under resonant conditions, only the resistance of the casing 60, which is reflected through the number of turns of the work coil(s) 82, 182, 282, is present; there is no reactance to limit the induced current.

In one embodiment, a plurality of temperature sensors, such as thermocouples, is spaced about the length of casing 60 of the heating device for determining the temperature of the casing 60 at various positions along its length during heating operations and sending the temperature data back to the controller. Preferably, the sensors measure temperature in real-time such that the controller may make adjustments to the driving current as necessary in response to varying conditions as they arise. For example, if the temperature detected in a zone exceeds desired levels, the controller can decrease or cease the driving current to the corresponding work coil until the temperature falls to an acceptable value.

In soil remediation or hydrocarbon recovery operations, several heating devices 20 can extend from ground surface G into the remediation zone and/or hydrocarbon formation. The heating devices 20 can be arranged into arrays to heat the soil within and around the arrays to desired temperatures.

In one embodiment, the heating device 20 is configured to generate a surface heat of over 1000° C. The maximum surface heat of the device 20 is constrained primarily by the melting point of the materials used for the work-coil 80 and casing 60. In some embodiments, devices 20 can be spaced in an array to achieve a minimum soil temperature of 250-800° C. in about the center of the array. For example, the devices 20 can be spaced about 1.5 m (5 feet) to about 6 m (20 feet) from one another. As device 20 generates heat through magnetically induced current in a conductive casing 60, a casing with a larger radius than those in existing pipe heating technologies can be used, thereby providing a greater heating surface. The size of the heating surface is inversely proportional to the amount of time required to achieve the desired temperature for soil remediation and/or hydrocarbon mobilization. As the surface area of a cylindrical casing (i.e. casing 60) is increased by increasing its radius, the effect of an increase in the radius of casing 60 is also inversely proportional to the time required to heat soil to the desired temperature.

For some operations, multiple heating devices 20 are used and arranged in arrays (for example, in the form of equilateral triangles, with one of heating devices at each vertex and the heating devices spaced apart from one another) and are extended to one or more soil zones to be heated. FIG. 8 provides a graphical illustration of the relationship between heating device diameter, temperature, and heating time of an array of three heating devices 20 operating at about 1500 Watts/m and positioned at the vertices of a substantially equilateral triangle, wherein each heating device 20 is about 2.5 meters (8 feet) apart from the others. The plotted temperatures are computed at the centroid of the triangle, which is about 1.4 m (4.6 feet) from any one of the vertices. The temperature-time plot for the array of heating devices 20 with 5 cm (2-inch) diameter casings, each having a wall thickness of about 3 mm (⅛ inch), is denoted by the reference character 102. Likewise, the temperature-time plots for the arrays of heating devices 20 with 7.6 cm (3-inch), 10 cm (4-inch), 13 cm (5-inch), and 15 cm (6-inch) diameter casings, each having a wall thickness of about 3 mm (⅛ inch), are denoted by the reference characters 103, 104, 105, and 106, respectively.

As can be seen in line 104 in FIG. 8, the array of heating devices 20 with 10 cm (4-inch) diameter casings is unable to reach a centroid temperature of 250° C. within 90 days. As shown in line 105, the array of heating devices with 13 cm (5-inch) diameter casings takes about 59 days to reach a centroid temperature of about 250° C. As shown in line 106, the array of heating devices with 15 cm (6-inch) diameter casings takes about 44 days to reach a centroid temperature of about 250° C.

Once remediation and/or hydrocarbon recovery operations are completed, the work-coil 80 and enclosure 40 (if placed underground) may be recovered from the soil by simply removing the enclosure 40 and pulling the work-coil 80 out from the casing 60. Enclosure 40 and work-coil 80 may then be reused for other operations as desired. The relatively inexpensive steel casing 60 can be abandoned in the soil. In this manner, about 60% or more of the materials used can be recovered, as opposed to 100% of materials being abandoned in typical prior art soil heating operations.

In a sample embodiment, casing 60 is a 15 cm (6-inch) carbon steel pipe, with 3 mm (⅛ inches) of refractory mortar coating on its inside wall, connected at its upper end by a flange connection to a steel upper cap 61 filled with refractory mortar. Connecting portions 83a, 83b and return portion 84 of the work-coil 80 extend from inside casing 60 through upper cap 61 to connect to the power unit 42. The power unit 42 is connected to an external power source 45 to receive about 50 to 300 volts 50/60 Hz alternating current therefrom, and has suitable electronic components, such as rectifiers and inverters, for converting the received power to a driving high-frequency driving alternating current that ranges from about 2 kHz to about 50 kHz. Power unit 42 can also have one or more capacitors in series or parallel to the work-coils 82a, 82b for achieving circuit resonance. The heating device also includes a controller for controlling and tuning the driving high-frequency alternating current. The work-coil 80 receives the driving high-frequency alternating current from the power unit 42. The work-coil 80 comprises a plurality of helical work coils 82 located at select axial locations along the length of the casing 60 for heating various soil zones and/or strata. Given a driving current with a frequency of within the range from 10 kHz to 50 kHz results in an induced eddy current in casing 60 with a skin depth of 110 μm to 50 μm, respectively. The frequency of the driving current may be tuned to about the resonant frequency of the circuit, which is determined at least in part by the skin depth, capacitors 47, the leakage inductance of the work coil 82, 182, 282, and the permeability of the casing 60.

Accordingly, heating device 20 can provide greater power to the heater element (i.e. casing 60) than existing technologies. For example, the sample embodiment is capable of providing about 2500 W/m via the induced eddy current in the casing 60 compared to about 700 W/m typically produced by conventional technologies. The more power provided to the casing by way of their internal work-coils, the more heat can be generated.

In accordance with a broad aspect of the present disclosure, there is provided a heating device for heating underground soil comprising: a conductive casing having a first end, a second end, and a wall defining an inner bore extending the first and second ends, and a temperature; a conductor, at least a part of the conductor being positioned in the inner bore, the conductor being electrically insulated from the casing; and a power unit connected to the conductor through the first end, the power unit configured to convert power received from a power source into at least one high-frequency driving alternating current and supply the at least one driving current to the conductor, wherein the conductor is configured to generate at least one magnetic field when the at least one driving current is supplied thereto to create at least one corresponding induced current in the casing, and wherein the at least one driving current is of a frequency sufficient for the at least one induced current to encounter resistance in the casing to increase the temperature.

According to another aspect, the conductor comprises one or more work coils. The one or more work coils can be helical coils. According to yet another aspect, the one or more work coils are positioned at an axial location in the inner bore for increasing the temperature of the casing at the axial location. The one or more work coils can be supported on a work coil support.

According to another aspect, the conductor is a single-phase conductor and the power unit comprises one or more single-phase inverters; or a three-phase conductor and the power unit comprises one or more three-phase inverters. According to yet another aspect, the conductor comprises one or more sets of three work coils axially arranged in series or one or more sets of three interleaved work coils.

According to another aspect, the conductive casing is a metal tubular member. The conductive casing can be made of a high-permeability and high-resistivity material. The wall of the casing has an inner surface that can be coated with refractory mortar. According to another aspect, the conductor can also be coated with refractory mortar.

According to another aspect, the heating device further comprises at least one capacitor connected in parallel or series with the conductor.

According to another aspect, the frequency of the at least one driving current is about the same as the resonant frequency of a circuit formed by at least the conductor, the casing, and the at least one capacitor.

According to another aspect, the heating device further comprises one or more temperature sensors positioned along the length of the casing; and a controller for receiving data from the one or more temperature sensors, and in response to the data, modifying the at least one driving current.

According to another aspect, the heating device further comprises an outer sleeve supported on the conductive casing and defining an annulus therebetween for receiving a transport fluid.

According to another broad aspect of the present disclosure, there is provided a system for heating one or more subterranean zones of soil comprising: a plurality of heating devices arranged in an array. In another aspect, the array is in a form of one or more triangles, with at least one of the plurality of heating devices at each vertex of the one or more triangles. The distance between adjacent heating devices is between about 1.5 m (5 feet) and about 6 m (20 feet).

According to another broad aspect of the present disclosure, there is provided a method of heating one or more subterranean zones of soil comprising: supplying at least one high-frequency driving alternating current each having a frequency to a respective at least one conductive coil housed inside a conductive casing, the at least one conductive coil being electrically insulated from the conductive casing, and the conductive casing being positioned in the one or more subterranean zones; and inducing at least one induced current in the conductive casing, wherein the frequency is selected to cause the at least one induced current to generate resistance in the conductive casing to increase a temperature of the conductive casing.

According to another aspect, the method further comprises converting an alternating utility current to at least one direct current, and converting the at least one direct current into the at least one high-frequency alternating driving current.

According to another aspect, each of the at least one conductive coil is connected in parallel or series with a corresponding at least one capacitor and the frequency of each of the at least one high-frequency driving alternating current is about the same as a resonant frequency of a circuit formed by a respective one of the at least one conductive coil, its corresponding at least one capacitor, and the conductive casing. The at least one high-frequency driving alternating current is single-phase or three-phase.

According to another aspect, the method further comprises collecting temperature data from at least one sensor positioned on the conductive casing; and selectively modifying the at least one alternating driving current in response to the collected temperature data. According to yet another aspect, the method further comprises injecting a transport fluid into an annulus defined between the conductive casing and an outer sleeve supported on the conductive casing.

What is claimed is:

1. A method of heating one or more subterranean zones of soil, the method comprising:
    converting an alternating utility electric current to at least one direct current, and converting the at least one direct current into at least one three-phase high-frequency driving alternating current;
    supplying the at least one three-phase high-frequency driving alternating current to three or more work-coils housed inside a water-tight sealed conductive casing and being electrically insulated from the conductive casing, each work-coil being supported on a work-coil support positioned coaxially and concentrically inside the work-coil and the conductive casing by one or more centralizers, the work-coil support defining a plurality of perforations and being formed or coated with an electrically insulated material, wherein the work-coils, the work-coil support, and the conductive casing are configured to withstand an operating temperature over 1000° C., and the conductive casing being positioned in the one or more subterranean zones; and
    inducing at least one induced current in the conductive casing,
    wherein the high-frequency driving alternating current is selected to cause the at least one induced current to generate heat on the conductive casing caused by skin-effect resistance of the conductive casing to increase a temperature of the conductive casing;
    wherein each phase of the at least one three-phase high-frequency driving alternating current is directed to a respective one of the three or more work-coils; and
    wherein the three or more work-coils are arranged axially in series and spaced apart to selectively heat the subterranean zones of the soil and form a temperature gradient;
    collecting temperature data from the conductive casing using one or more sensors positioned on the conductive casing; and
    a selectively modifying a frequency of the at least one three-phase high-frequency driving alternating current in response to the collected temperature data.

2. The method of claim 1, wherein the three or more work-coils are connected in parallel or series with at least one capacitor and the frequency of each phase of the at least one three-phase high frequency driving alternating current is about the same as a resonant frequency of a circuit formed by a respective one of the three or more work-coils, its corresponding capacitor, and the conductive casing.

3. The method of claim 1, further comprising providing at least three of the water-tight sealed conductive casings, and supplying at least three driving alternating currents to at least three conductor groups each housed inside a respective conductive casing, the at least three water-tight sealed conductive casings arranged in an array to heat the one or more subterranean zones.

4. The method of claim 3, further comprising arranging the at least three conductive casings to form one or more triangular arrays generating a minimum soil temperature ranging from 250° C. to 800° C., each conductive casing forming a vertex of the one or more triangular arrays.

5. The method of claim 4, wherein the distance between each of the conductive casings is within the range of 1.5 m (5 feet) to 6 m (20 feet).

6. The method of claim 1, wherein the frequency of the at least one three-phase high-frequency driving alternating current is selected such that the skin-effect resistance is sufficient to generate heat when the high-frequency driving alternating current is induced in the casing.

7. The method of claim 1, wherein the three or more work-coils are axially extending conductive coils.

8. The method of claim 1, wherein the work-coils are helical conductors.

9. The method of claim 1, wherein the three or more work-coils are electrically interconnected into delta or wye three-phase electric circuits.

10. The method of claim 1, wherein the conductive casing is formed of a conductive material having a relative permeability ranging from 100 to 2000, and an inner surface coated with a refractory material conferring electrical and thermal insulation.

11. The method of claim 1, wherein a conductor comprising the work-coils is coated with a refractory material conferring electrical and thermal insulation.

12. A method of heating one or more subterranean zones of soil, the method comprising:
    converting an alternating utility electric current to at least one direct current, and converting the at least one direct current into at least one three-phase high-frequency driving alternating current;
    supplying the at least one three-phase high-frequency driving alternating current to three or more work-coils housed inside a water-tight sealed conductive casing and being electrically insulated from the conductive casing, each work-coil being supported on a work-coil support positioned coaxially and concentrically inside the work-coil and the conductive casing by one or more centralizers, the work-coil support defining a plurality of perforations and being formed or coated with an electrically insulated material, wherein the work-coils, the work-coil support, and the conductive casing are configured to withstand an operating temperature over 1000° C., and the conductive casing being positioned in the one or more subterranean zones; and
    inducing at least one induced current in the conductive casing,
    wherein the high-frequency driving alternating current is selected to cause the at least one induced current to generate heat on the conductive casing caused by skin-effect resistance of the conductive casing to increase a temperature of the conductive casing;
    wherein each phase of the at least one three-phase high-frequency driving alternating current is directed to a respective one of the three or more work-coils; and
    wherein the three or more work-coils are interleaved;
    collecting temperature data from the conductive casing using one or more sensors positioned on the conductive casing; and
    selectively modifying a frequency of the at least one three-phase high-frequency driving alternating current in response to the collected temperature data.

13. The method of claim 12, wherein the three or more work-coils are axially extending conductive coils.

14. The method of claim 12, wherein the three or more work-coils are connected in parallel or series with at least one capacitor and the frequency of each phase of the at least one three-phase high-frequency driving alternating current is about the same as a resonant frequency of a circuit formed by a respective one of the three or more work-coils, its corresponding capacitor, and the conductive casing.

15. The method of claim 12, wherein the frequency of the at least one three-phase high-frequency driving alternating current is selected such that the skin-effect resistance is sufficient to generate heat when the high-frequency driving alternating current is induced in the casing.

16. The method of claim 12, wherein the work-coils are helical conductors.

17. The method of claim 12, wherein the three or more work-coils are electrically interconnected into delta or wye three-phase electric circuits.

* * * * *